United States Patent
Cornils et al.

(10) Patent No.: US 9,903,308 B2
(45) Date of Patent: Feb. 27, 2018

(54) METHOD FOR DETECTING AND CORRECTING VEHICLE REFERENCE SPEED AND VEHICLE SYSTEM

(75) Inventors: Arne Cornils, Frankfurt (DE); Manuel Kasten, Hattersheim (DE); Nikolaus Reim, Pfaffenhofen (DE)

(73) Assignee: AUDI AG, Ingolstadt (DE)

(*) Notice: Subject to any disclaimer, the term of this patent is extended or adjusted under 35 U.S.C. 154(b) by 0 days.

(21) Appl. No.: 13/978,977

(22) PCT Filed: Dec. 7, 2011

(86) PCT No.: PCT/EP2011/072109
§ 371 (c)(1),
(2), (4) Date: Jul. 10, 2013

(87) PCT Pub. No.: WO2012/100871
PCT Pub. Date: Aug. 2, 2012

(65) Prior Publication Data
US 2013/0297189 A1    Nov. 7, 2013

(30) Foreign Application Priority Data
Jan. 28, 2011  (DE) .................... 10 2011 003 298

(51) Int. Cl.
*F02D 43/04*  (2006.01)
*B60T 8/172*  (2006.01)
*B60T 8/1769*  (2006.01)

(52) U.S. Cl.
CPC ............. *F02D 43/04* (2013.01); *B60T 8/172* (2013.01); *B60T 8/1769* (2013.01);
(Continued)

(58) Field of Classification Search
CPC ............. B60T 2201/09; B60T 2250/04; B60T 2270/611; B60T 8/172; B60T 8/1769; F02D 43/04
(Continued)

(56) References Cited

U.S. PATENT DOCUMENTS 5,183,128 A * 2/1993 Ito .................... B60K 28/16
                                                    180/197
5,435,635 A * 7/1995 Watanabe ............. B60T 8/172
                                                    303/166
(Continued)

FOREIGN PATENT DOCUMENTS

DE   198 10 213 A1   9/1999
DE   199 39 979 A1   8/2000
(Continued)

OTHER PUBLICATIONS

PCT International Search Report—dated Feb. 28, 2012.
German Examination Report—dated Jun. 24, 2011.

*Primary Examiner* — Hieu T Vo
*Assistant Examiner* — Carl Staubach
(74) *Attorney, Agent, or Firm* — Maier & Maier, PLLC

(57) ABSTRACT

A method for detecting and correcting vehicle reference speed, in particular when the speed undergoes a controlled reduction due to drag or regeneration torque, of an all-wheel drive vehicle. The longitudinal acceleration of the motor vehicle, and the wheel accelerations are determined by sensors. The method is to provide reliable determination of the vehicle reference speed and the initiation of corrective measures once a controlled reduction has been recognized. The steps include filtering the wheel accelerations, filtering the longitudinal accelerations, forming a corrected longitudinal acceleration by applying a safety offset and a correction offset to the filtered longitudinal acceleration, and temporal integration of the difference between the corrected (Continued)

longitudinal acceleration and the respective wheel acceleration. In the event a threshold value of the absolute value of the difference is exceeded during a predetermined time interval with a preset number of wheels, step for adjusting the correction offset are initiated.

17 Claims, 2 Drawing Sheets

(52) U.S. Cl.
    CPC ....... *B60T 2201/09* (2013.01); *B60T 2250/04* (2013.01); *B60T 2270/611* (2013.01)
(58) Field of Classification Search
    USPC .......................................................... 701/110
    See application file for complete search history.

(56) References Cited

U.S. PATENT DOCUMENTS

| | | | | |
|---|---|---|---|---|
| 5,563,793 | A * | 10/1996 | Nakaura | B60T 8/172 180/197 |
| 5,579,230 | A * | 11/1996 | Lin | B60T 8/172 180/197 |
| 5,701,247 | A * | 12/1997 | Sasaki | B60K 23/0808 180/197 |
| 5,797,664 | A * | 8/1998 | Tagawa | B60K 23/0808 180/244 |
| 6,189,643 | B1 * | 2/2001 | Takahashi | B60K 23/0808 180/248 |
| 8,775,040 | B2 * | 7/2014 | Noumura | B60W 30/02 136/256 |
| 2001/0029420 | A1 * | 10/2001 | Kawasaki | B60T 8/172 701/80 |
| 2003/0028309 | A1 * | 2/2003 | Inoue | B60T 8/17636 701/81 |
| 2006/0055234 | A1 * | 3/2006 | Choi | B60T 8/17616 303/113.1 |
| 2007/0175720 | A1 * | 8/2007 | Yoshida | F16D 25/123 192/3.63 |
| 2008/0071452 | A1 * | 3/2008 | Tan | B60T 8/172 701/70 |
| 2010/0070142 | A1 * | 3/2010 | Patil | B60T 8/172 701/48 |
| 2011/0269595 | A1 * | 11/2011 | Marsh | F16H 48/30 475/220 |
| 2013/0297189 | A1 * | 11/2013 | Cornils | B60T 8/172 701/110 |

FOREIGN PATENT DOCUMENTS

| | | | |
|---|---|---|---|
| DE | 10 2004 040 757 A1 | 7/2005 | |
| DE | 102004040757 A1 * | 7/2005 | .......... B60W 40/105 |
| DE | 10 2007 044 195 A1 | 10/2008 | |
| DE | 199 39 979 B4 | 12/2011 | |
| DE | 10 2007 044 195 B4 | 1/2013 | |
| EP | 0 331 131 | 2/1989 | |
| EP | 0395594 * | 10/1990 | ................ B60T 8/00 |
| WO | WO 02/32732 A1 | 4/2002 | |

* cited by examiner

METHOD FOR DETECTING AND CORRECTING VEHICLE REFERENCE SPEED AND VEHICLE SYSTEM

CROSS REFERENCE TO RELATED APPLICATIONS

This application claims priority to German Patent Application No. 10 2011 003 298.3, filed Jan. 28, 2011; and PCT/EP2011/072109, filed Dec. 7, 2011.

FIELD OF THE INVENTION

The invention relates to a method for the detection and correction of the vehicle reference speed of a motor vehicle, in particular during its reduction by drag torque and/or regeneration torque, in particular of an all-wheel drive vehicle having an engine and an engine controller and having a sensor for the measurement of the longitudinal acceleration of the motor vehicle, the longitudinal acceleration of the motor vehicle being measured with the aid of the sensor and the wheel accelerations being determined with the aid of wheel speed sensors. It also relates to an associated vehicle system.

BACKGROUND OF THE INVENTION

Modern motor vehicles comprise, in addition to their basic functionality, various control and regulation programs, which assist the driver in hazardous situations, e.g. in the event of heavy braking processes, during spinning processes or in other situations in which the vehicle threatens to become unstable, and act to impose stabilization of the vehicle. Here in particular the anti-lock braking system (ABS), the traction control (ASR) and the electronic stability program (ESP) have been established and proven. All three programs or systems intervene actively in the control of the vehicle in situations in which the stability of the vehicle is at risk. E.g. if the ABS detects the locking of one or more wheels during a braking process, the adhesion of said wheels to the ground is improved again by the required pressure decrease and pressure build-up in the brakes. By means of said measures, the braking distance is not necessarily shorter, but the vehicle is in a stable state during the braking process. Equally, spinning of the wheels, e.g. on a slippery surface, can be detected with the aid of the traction control. Here too, the adhesion of the wheels on the road or on the ground is improved by suitable countermeasures. Stabilization of the automobile in situations in which the automobile is at risk of spinning and leaving the highway, e.g. during fast travel round a bend, can be achieved by the ESP, the vehicle being kept on track by means of short braking pulses.

An important component of the ESP and ASR systems is the engine braking control (MSR), which prevents wheel slip of the driven wheels, in particular on a smooth highway, if the driver abruptly takes his foot off the gas or the clutch is engaged too quickly when downshifting. The controller of the engine or the engine controller then temporarily increases the torque at the demand of the ESP controller in order to keep the vehicle stable. In the case of hybrid vehicles, instead of an engine controller a hybrid manager is usually used, which controls both the internal combustion engine and also the electric motor. Furthermore, powertrain managers are also used. Within the scope of this claim, engine controller in each case means the corresponding apparatus used in the vehicle.

A parameter that plays an important part in all said situations is the so-called slip of the respective wheel, which characterizes the ratio of the actual distance travelled per wheel revolution and the actual wheel circumference. Slip can also be characterized as the ratio of the revolution rate of a driven wheel to that of a (hypothetical) undriven and therefore positively idling wheel.

Whereas a small amount of slip is necessary so that the vehicle can primarily be driven by the wheels, a large amount of slip usually characterizes situations in which the vehicle is unstable. Thus e.g. locking of the wheels is characterized by a large amount of braking slip and spinning of the wheels is characterized by a large amount of drive slip.

For many control mechanisms, which are intended to stabilize the vehicle, the knowledge of the actual vehicle speed is of advantage or is necessary. Said parameter is not determined or cannot be easily determined directly or indirectly in normal systems. It can, however, be determined indirectly, e.g. by means of signals that are determined from wheel speed sensors, which are associated with the respective wheels. If the vehicle speed or vehicle reference speed is known, slip can be detected by means of a comparison with the rotational speeds of the individual wheels.

A known technical object to be achieved therefore consists of determining the vehicle speed from the information provided by the wheel speed sensors in a very reliable manner—the individual wheels can enter into slip. For vehicles with only one driven axle, the signals of the wheel speed sensors associated with the non-driven wheels are particularly advantageously suitable.

This manner of determining the vehicle speed is not easily possible for vehicles in which all wheels are driven, i.e. for all-wheel drive vehicles. Especially with these vehicles, however, it is important to detect a reduction of the reference speed or the vehicle reference speed. A reduction here is understood to be the process by which the determined vehicle reference speed continuously deviates further from the actual vehicle speed. This is in particular in the direction in which the determined vehicle reference speed is lower than the actual vehicle reference speed. A method for the detection of an incorrect vehicle reference speed is known from DE 199 39 979 A1, whereby one or more wheels are decoupled from the drive as required, the detection being carried out with reference to the running properties of the suitably decoupled wheel or wheels.

The detection of the reduction of the reference speed in the context of the technical capabilities of electronic brake systems is especially important for all-wheel drive vehicles with a rigid longitudinal differential (Torsen differential) when coasting or even rigid all-wheel drives or even for hybrid vehicles. The detection of the reduction is especially important in vehicles of this type with large internal combustion engines, with which a large drag torque can be generated, as well as for hybrid vehicles with an electric motor which is used as a generator during braking processes and in this way sometimes generates very strong regeneration torque. A large drag torque occurs e.g. when the driver suddenly takes his foot off the gas or suddenly engages a significantly lower gear. In the presence of such a drag torque or regeneration torque it can occur that all wheels are drawn into slip in synchronism at low coefficients of friction by the drag torque. This means that the wheels turn slower in practice and thus roll over a shorter distance than is traversed by the vehicle.

The occurrence of slip can take place with low dynamics, so that e.g. the ESP controller assumes a normal actual or real deceleration of the vehicle. Because the ESP controller starts from a regular or normal deceleration, no measures for stabilizing the vehicle are initiated. The reduction of the vehicle reference speed, which in the above described cases is a gradual process, then leads to a completely unstable vehicle. Therefore this is especially also the case because the cornering forces of the wheels decrease rapidly for increasing slip.

In these cases the vehicle can hardly be controlled or cannot be controlled at all and usually begins to spin uncontrollably. The problems mentioned occur as soon as the wheel drag torques are greater than the coefficient of friction between the highway and tires that allows this. This can typically occur on black ice. However, for larger or increasing drag torques or regeneration torques, such a process is also conceivable on highways with different surfaces.

A reference decrease or the decrease of the vehicle reference speed was previously unknown or only inadequately known for the above-mentioned vehicle types. The necessity of such detection is, however, strongly increased by the modern developments of hybrid vehicles and all-wheel drive vehicles.

The object of the invention is to provide a method for the detection and correction of the vehicle reference speed, in particular in the event of its decrease by drag torques and/or recovery torques, that on the one hand enables extremely reliable determination of the vehicle reference speed as well as the introduction of corrective measures as soon as a decrease has been detected, and on the other hand can make use of normally constructed components and control and regulation routines. Furthermore, an associated vehicle system is to be specified.

SUMMARY AND INTRODUCTORY DESCRIPTION OF THE INVENTION

With respect to the method, said object is achieved according to the invention by the following steps:
filtering the wheel accelerations,
filtering the longitudinal acceleration,
forming a corrected longitudinal acceleration by subjecting the filtered longitudinal acceleration to a safety offset and to a correction offset,
integration against time of the difference between the corrected longitudinal acceleration and the respective wheel acceleration, steps for correction being initiated on exceeding a threshold value of the absolute value of the difference during a specified time interval for a specified number of the wheels.

The correction of the vehicle reference speed is understood to mean measures having the objective of reducing the slip of the wheels and of stabilizing the vehicle in terms of driving dynamics, by means of which the vehicle speed determined from the wheel accelerations and the actual vehicle speed also converge on each other again.

The invention is based on the consideration that for the avoidance of additional electronic components and the resulting additional costs, a method for the detection of a decrease in the vehicle reference speed should advantageously make use of the components or signals already available in the on-board electronics. Components that are normally present in all-wheel drive vehicles are e.g. an engine controller, a sensor with which the longitudinal acceleration of the vehicle is determined (normally an acceleration sensor) as well as control and evaluation equipment, such as e.g. electronic ESP or ASR components. In such a system the wheel accelerations can be determined using wheel speed sensors.

As has now been recognized, a decrease of the vehicle reference speed can be reliably determined by drawing on data provided by these components, by integrating the difference between the longitudinal acceleration and the respective wheel acceleration over a certain time interval, wherein, on exceeding said acceleration integrated against time of a predetermined limit value or threshold value, measures can be initiated for the stabilization of the vehicle or for the correction of the vehicle speed.

The invention is also based on the consideration that the wheel accelerations and the longitudinal accelerations should be pre-processed for the reliability of such a method. In order to achieve reliable indications, and not for instance to draw false conclusions on the basis of spurious signal fluctuations or signal steps that result from the noise or the limited resolution of the corresponding signals, said signals should be smoothed or filtered in a suitable manner prior to the mentioned integration. In addition to this, it should be taken into account that the acceleration measured by the longitudinal acceleration sensor can contain both static longitudinal acceleration sensor errors and also admixtures of components of the Earth's gravitational field, in particular in hilly terrain. Such effects should be taken into account in the detection algorithm.

Such pre-processing of the longitudinal acceleration can, as has already been recognized, take the static error or the resolution limit of the sensor into account by subjecting the filtered longitudinal acceleration to a safety offset, and a correction offset that contains a dynamic correction can be taken into account.

The magnitude and the type of the error with which the signal of the longitudinal acceleration sensor is associated vary depending on the vehicle dynamic situation. For example, the admixture of the Earth's gravitational field, i.e. the component of the acceleration due to gravity g in the direction of motion of the vehicle, depends on the instantaneous gradient of the highway.

In order to take account of said time-varying necessary signal corrections, the correction offset is preferably calculated essentially continuously during the operation of the vehicle. The correction offset is thus dynamically adapted to the instantaneous vehicle situation in each case. In this way it can be avoided that erroneous deviations of the measured longitudinal acceleration from the wheel accelerations are evaluated as a decrease of the vehicle reference speed, whereas said differences are in reality caused by a signal of the longitudinal acceleration sensor that is in need of correction.

The correction offset is preferably calculated as the difference between the preferably twice filtered longitudinal acceleration and a wheel acceleration that is preferably twice filtered and averaged over the four wheels. In an alternative embodiment of the method, only the smallest of the four wheel accelerations is used. In another alternative embodiment, only two or three wheel accelerations are averaged. Not every vehicle dynamic situation in which the vehicle can find itself is uniformly suitable for the calculation or determination of the correction offset. In certain driving dynamic states of the vehicle the calculation of the correction offset from the available signals or the learning of the correction offset should therefore advantageously be omitted.

The calculation of the correction offset is then advantageously omitted if the magnitude of the total drag torque in the plane of the wheel exceeds a predetermined threshold value. This means that the total wheel drag torque is smaller than a predetermined negative value, e.g. −300 Nm. In this case the probability that the wheels have strong slip at a suitably low or movable coefficient of friction is very high. The total wheel torque is preferably determined by converting the drag torque transmitted by the engine controller in the ASR into a wheel torque using the gear ratio.

Furthermore, for learning the correction offset the vehicle should be in motion and advantageously at least be moving at walking pace. The calculation of the correction offset is advantageously then omitted if the actually determined vehicle reference speed is below a predetermined threshold value. A suitable threshold value for this is e.g. 5 km/h.

For learning the correction offset, a stable vehicle dynamic state of the vehicle with as constant a speed as possible is advantageous, because the artifacts caused by the static longitudinal acceleration sensor error and the gradient are to be identified during learning of the offset. Preferably the calculation of the correction offset is thus omitted if during a predetermined time interval the difference between the maximum and minimum wheel acceleration for at least one wheel changes by more than a predetermined threshold value. However, for this purpose all four wheels are advantageously taken into account, the difference between the maximum wheel acceleration of one of the wheels and the minimum wheel acceleration of one of the wheels being determined. The time interval during which the difference may not exceed a predetermined threshold value, e.g. 0.012 g, is advantageously 70 ms (which essentially corresponds to 7 loops for a cycle time of 10 ms of typical control units).

The determination or calculation or the learning of the correction offset is advantageously also then omitted if the wheel steering angle magnitude exceeds a predetermined value. Said value is advantageously 2.5°. This ensures that the vehicle travels essentially in a straight line, so that in the determination of the correction offset no unwanted artifacts arise as a result of travelling round a bend (geometric slip).

Furthermore, the calculation of the correction offset is advantageously then omitted if a load change and/or downshift is carried out during a predetermined time interval. Stated in another way, the determination of the correction offset only takes place if no downshift process or load change has occurred in a predetermined time interval. Such a time interval is advantageously 1 s.

Because the driving dynamic situation of the vehicle continuously changes—this can relate in particular to gradients or even to the quality of the highway—the correction offset is advantageously characterized as invalid if the last adaptation of the correction offset is older than a predetermined time interval, e.g. 10 s. This can prevent conclusions regarding the vehicle reference speed which do not correspond to the current driving situation from being drawn by using an out of date correction offset. This also enables corresponding correction measures based on erroneous assumptions to be avoided. In the event of a correction offset characterized as invalid, the decrease detection is thus not continued.

It is advantageous for the implementation of the method if the signals of the wheel accelerations and the longitudinal acceleration are substantially freed of noise components and artifacts resulting from the limited signal resolution. Thus it can be advantageous if the longitudinal acceleration is subjected to a second filtering prior to the formation of the corrected longitudinal acceleration. Equally, it can be advantageous if the wheel accelerations are subjected to a second filtering following a first filtering. Advantageously, in the second filtering the wheel accelerations and the longitudinal accelerations are low pass filtered and are adapted to each other in such a way that the filtered signals have no phase delay in the stable vehicle state. Depending on the filter or filter algorithm used, this can be achieved by means of an adaptation of the respective filter constants. In alternative embodiments, instead of the low pass filtering a different filter algorithm based on an IIR or FIR Filter can be used that leads to suitable signal smoothing.

The integration against time of the difference between the corrected longitudinal acceleration and the respective wheel acceleration is advantageously started when a decrease at the wheels is technically possible as a result of very low coefficients of friction at the existing regeneration torque or drag torque. This can advantageously occur if the regeneration or drag torque is less than a predetermined threshold value. A suitable threshold value for starting the integration is e.g. −400 Nm.

The integration is advantageously ended on each occasion after the expiry of a predetermined maximum integration time, advantageously 15 s. After this time interval it is preferably re-started if the conditions described above are fulfilled and if a valid correction offset exists.

On detecting a decrease of the vehicle reference speed, with the method according to the invention steps are provided for its correction or for the stabilization of the vehicle. A trigger threshold is provided for the initiation of these steps. Said trigger threshold is then reached if the integral outlined above exceeds a predetermined threshold value, advantageously for each wheel respectively. Such a threshold value is advantageously 0.5 km/h. If the integral reaches this value—preferably for all four wheels—then the decrease in the vehicle reference speed qualifies as detected.

Advantageously, the corresponding correction steps are, however, not initiated immediately, but there is a wait for the expiry of a safety time element of e.g. 120 ms before the steps for the correction are initiated. In other words: in the selected example the integral should be below the threshold value, advantageously for all four wheels, for at least 120 ms.

Various measures for correction or vehicle stabilization can be considered. In a preferred embodiment of the method, a diagonally distributed supporting pulse (e.g. left front wheel and right rear wheel) is triggered at the wheels of the motor vehicle for correction of the vehicle reference speed. Such a supporting pulse, which is normally implemented in conventional anti-slip control modules and preferably has a hydraulic pressure of 5 bar to 10 bar, results in the wheels of an axle having a difference in revolution rate. The unpressurized wheel thus returns to the actual or true vehicle speed and the wheel subjected to pressure changes to deeper or increased slip, whereby the engine braking control (MSR) is triggered. In the event that the decrease in the vehicle reference speed has been falsely detected, the triggering of the supporting pulse has no negative effect on the stability of the vehicle.

Alternatively or additionally to the above-described measure, advantageously an engine braking control request is sent to the engine controller. In the case of hybrid vehicles the engine controller is called the hybrid controller, which contains control and regulating functions of both the internal combustion engine and also of the electric motor. Such a request can have an advantageous value of e.g.—40 Nm. The reduction of the drag torque resulting from this request (for internal combustion engines or the regeneration reduction for hybrid vehicles) causes the wheels to return to the true vehicle speed and thus supports the vehicle reference speed. In the event of a false detection of the decrease, a slight under braking is carried out by this measure.

In relation to the vehicle system, the above-mentioned object is achieved according to the invention with an engine controller, a sensor for the measurement of the longitudinal acceleration and an electronic control and regulation unit, in which a method illustrated above is carried out.

The control and regulation unit can be a separate unit. It can also be combined in hardware and/or software terms with a unit that is already available in the vehicle or can be integrated into it.

The advantages of the invention consist in particular in that by the use of signals that are already available in modern all-wheel drive vehicles for the determination of the vehicle reference speed, the demand on the hardware side for the method can be kept extremely low. The occurrence of slip can be reliably detected by the upward integration of the difference between the longitudinal acceleration and the respective wheel acceleration. This is in particular possible through dynamic or continuous calculation of a correction offset, a more reliable value of the longitudinal acceleration of the vehicle being achieved by the application of a safety offset and of a correction offset to the value of the longitudinal acceleration. By coupling the determination of the correction offset to certain driving dynamic conditions, it is achieved that the correction offset optimally reflects the artifacts such as the influences of the gradient as well as static sensor errors.

BRIEF DESCRIPTION OF THE DRAWINGS

An example embodiment of the invention is explained in detail using drawings. These show in a highly schematic illustration.

The same parts are provided with the same reference numbers in both figures.

DETAILED DESCRIPTION OF THE INVENTION

Figure 1:
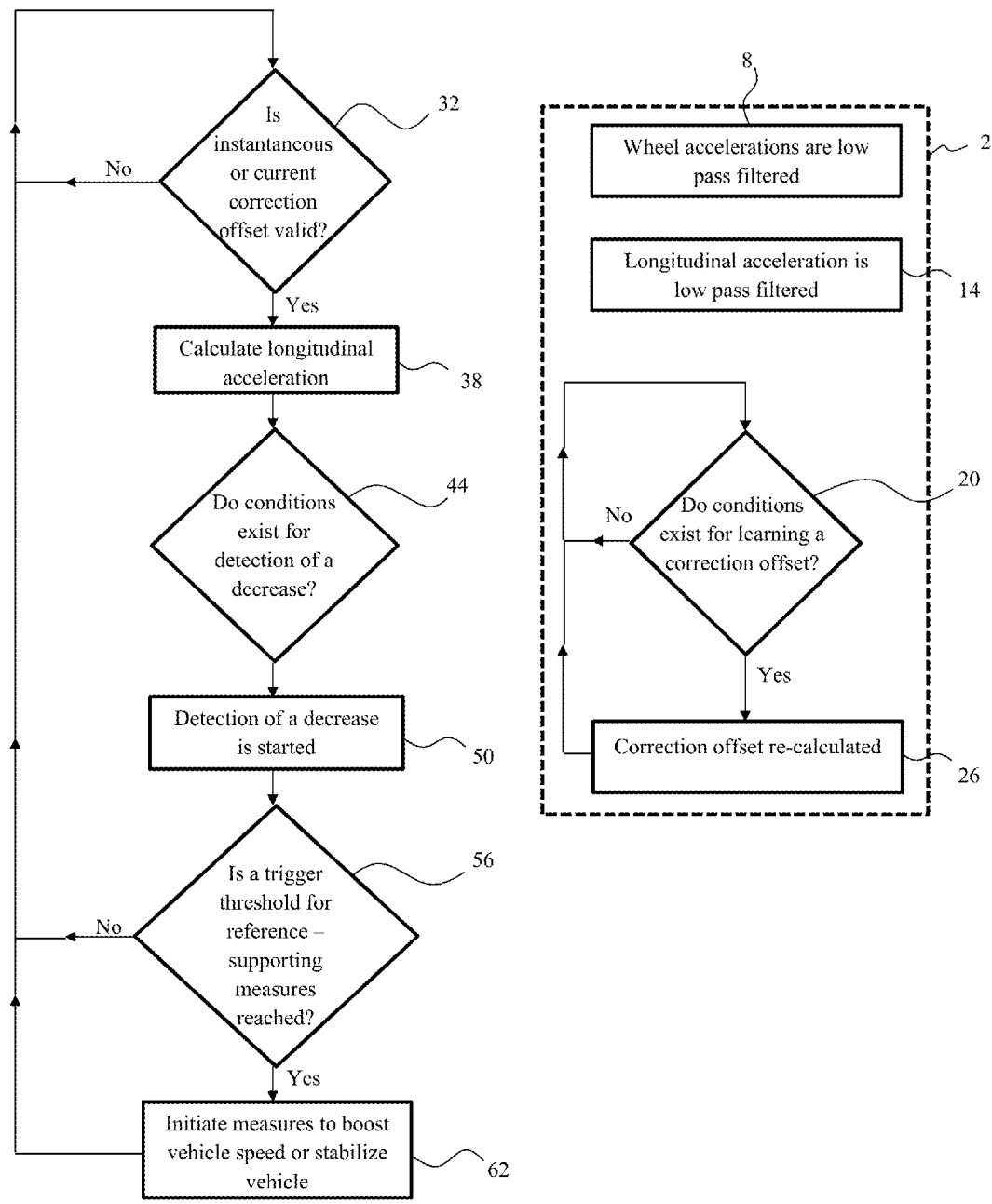
FIG. 1 a block diagram of a method for the detection and correction of the vehicle reference speed in a preferred embodiment for an all-wheel drive vehicle, and FIG. 2 a motor vehicle having a vehicle system with an engine and an engine controller, a sensor for the measurement of the longitudinal acceleration and an electronic control and regulation unit for the implementation of the method according to FIG. 1.

The method illustrated in FIG. 1 for the detection and correction of the vehicle reference speed uses signals that can normally be made available by various electronic components of an all-wheel drive vehicle. These are the longitudinal acceleration of the vehicle, i.e. the acceleration in the direction of travel for straight-line travel of the vehicle, and the individual wheel accelerations. The latter are determined with the aid of the wheel speed sensors associated with the individual wheels.

For the determination of a possible decrease of the vehicle reference speed, these signals are still processed intermediately. Various process steps are run in the process for this—if required in parallel.

The process steps illustrated in the dashed box 2 by blocks 8, 14, 26 and the decision 20 are preferably carried out essentially continuously. In block 8 the wheel accelerations are low pass filtered. In block 14 the longitudinal acceleration measured by the longitudinal acceleration sensor is low pass filtered. The filter constants of the respective low pass filters for the wheel accelerations and the longitudinal acceleration are adapted to each other here in such a way that the filtered signals have no phase delay in the stable vehicle state. Simultaneously occurring, small deviations between the longitudinal acceleration and the wheel accelerations can also thus be detected.

In an alternative embodiment of the method the steps in blocks 8 and 14—i.e. the filtering—take place as required if the method carries out an integration against time of the difference between the respective wheel acceleration and the longitudinal acceleration. For the integration against time of said difference, however, the filtered longitudinal acceleration as such is not used. It is previously provided with two corrections: a safety offset and a correction offset.

The safety offset is a constant value, in the present example embodiment it is 0.02 g, which is added to the filtered longitudinal acceleration and makes the method robust against uncertainties such as noise, signal resolution etc.

The correction offset is dynamically adapted to the instantaneous driving situation of the vehicle and essentially compensates the gradient of the highway and static longitudinal acceleration errors. The correction offset is re-calculated or re-learnt as near continuously as possible. It is formed from the delta or the difference between the filtered longitudinal acceleration and the wheel acceleration averaged over the four wheels.

In the decision 20 it is checked whether suitable conditions exist for learning a correction offset, which is applied to the filtered longitudinal acceleration. If these conditions exist, the correction offset is re-calculated in block 26. If the condition does not exist, the decision 20 is called up again, whereby it is checked again whether the correction offset can be determined. The steps in decision 20 and block 26 are to some extent instructions that are implemented in a loop. In an alternative, serial embodiment of the method, which is especially well suited to implementation in control equipment, the process steps in the blocks or decisions 8, 14, 20, 26 as well as—as required—the steps yet to be discussed in the blocks or decisions 32, 38, 44, 50, 56, 62, are implemented essentially sequentially or one after the other during a loop of the control unit.

The method branches from the decision 20 to block 26, in which the correction offset is determined, only under certain predetermined conditions. In the present example embodiment the recalculation only takes place if the value of the longitudinal acceleration is valid, i.e., if the longitudinal acceleration sensor exhibits no internal functional errors. Furthermore, the correction offset is only calculated if the current determined vehicle reference speed exceeds 5 km/h, i.e. the vehicle is moving at least at walking speed. Moreover, the magnitude of the wheel steering angle does not exceed a value of 2.5°, i.e. the vehicle should essentially be moving in a straight line. Furthermore, the wheels may not have been spinning for 2 s. This condition can be quantified using the summed slip of all wheels, i.e. the sum of the respective wheel slips, which should be smaller than 2.25 plus one fiftieth of the vehicle reference speed, which is preferably determined using a Traction Control System (TCS) integrated in the vehicle.

Moreover, the wheels should run in a stable and smooth manner during a predetermined time interval of a predetermined time, e.g. of 7 loops, a loop corresponding to a cycle time of 10 ms. That means that the maximum acceleration measured at the wheels and filtered minus the minimum acceleration should be smaller than 0.012 g. Furthermore, the correction offset is only then calculated if no ESP, ABS or EDS intervention is made during the last 2 s. Furthermore, no downshift or load change should occur for at least 1 s. In addition to this, the drag torque in the present example embodiment should exceed −300 Nm, i.e. its magnitude should be small enough to be able to be sure that the wheels do not start to slip.

In parallel with the process steps 20 and 26 illustrated in the dashed box 2, process steps run that are discussed below. Alternatively to this, said process steps can run after the steps illustrated in box 2, so that in each loop of the controller all steps run one after the other. Certain steps can also be omitted here—independently of the output of the corresponding decisions 20, 32, 44, 56.

In decision 32 it is checked whether the instantaneous or current correction offset is valid. For example, the correction offset is characterized as invalid if its calculation was longer ago than 10 s. This prevents a false detection that is caused by the fact that the vehicle dynamic conditions have changed, and the correction offset no longer represents a suitable correction for the value of the longitudinal acceleration measured by the longitudinal acceleration sensor. In the case in which the correction offset is valid, a corrected longitudinal acceleration is calculated in block 38. For this the filtered longitudinal acceleration is subjected to a safety offset of 0.02 g (other values can also be selected here depending on the vehicle and application) and can be subjected to the correction offset. If the correction offset is not valid, the method branches back to decision 32 again. As explained above, a detection of a decrease should only be carried out if the correction offset has a reliable value.

In decision 44 it is now checked whether conditions exist, based on which the detection of a decrease should be started. The sequence of decisions 32 and 44 can also take place in the reverse order, or the instructions of the two decisions 32, 44 can essentially be carried out simultaneously.

The detection of a decrease in block 50, which is carried out by means of the integration against time of the difference between the corrected longitudinal acceleration and the respective wheel acceleration, is started in the present example embodiment when the drag torque is less than −400 Nm. Such a situation occurs e.g. if the driver suddenly takes his foot off the gas or engages a lower gear. With drag torques of this order of magnitude, a decrease at the wheels as a result of very small coefficients of friction is technically possible.

As an example a SUV according to the current state of the art with currently normal regeneration efficiency can be cited here. With the version having an internal combustion engine the relevant range in which the integration is started is limited to the first to second gear. With the hybrid version with a maximum of 1500 Nm regeneration torque, the relevant range is in the speed range between 20 km/h and 70 km/h.

The integration of the difference between the corrected longitudinal acceleration and the wheel acceleration is carried out wheel by wheel. The integration is terminated in each case if the integration has already lasted 15 s or if the drag torque is again greater than −300 Nm. In this case a gradual slip increase of the wheels can no longer be assumed. The integration is further terminated if the value of the longitudinal acceleration essentially continuously measured by the longitudinal acceleration sensor is invalid or if an ESP or ABS intervention occurs.

In decision 56 it is checked whether a trigger threshold for reference-supporting measures has been reached. A decrease in the vehicle speed qualifies as detected if the completed integral reaches or exceeds the threshold value of 0.5 km/h for all four wheels. If this is the case, measures are initiated in block 62 for boosting the vehicle speed or for the stabilization of the vehicle. However, this only occurs after a safety time interval of e.g. 120 ms has elapsed, during which the trigger threshold or trigger condition (threshold value of 0.5 km/h is achieved) must persist. In the present example embodiment the measures consist of a (in relation to the spatial disposition of the wheels) diagonal supporting pulse and/or of a MSR request to the engine or hybrid controller. After carrying out the reference-supporting measures the method branches back to decision 32.

Figure 2:
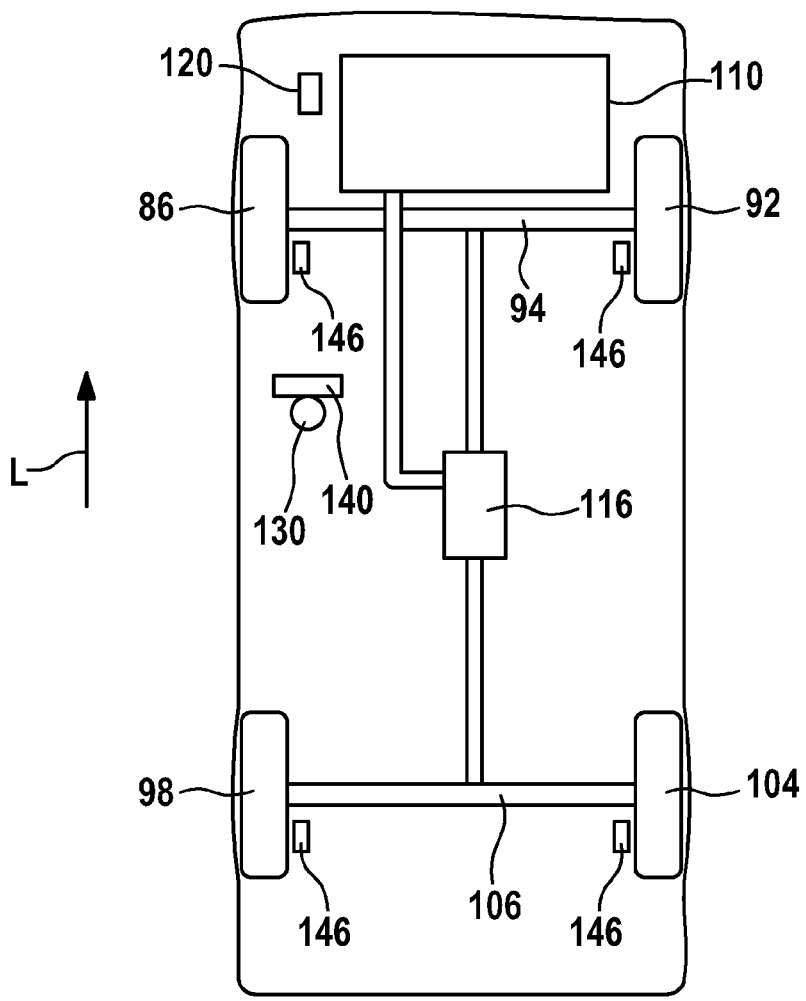

The motor vehicle 80 illustrated in FIG. 2, which is designed as an all-wheel drive vehicle, comprises two front wheels 86, 92, which are joined to a front axle 94, and two rear wheels 98, 104, which are joined to a rear axle 106. The motor vehicle 80 is driven by an engine 110, which drives both axles 94, 106 via a central differential 116.

The motor vehicle 80 comprises a vehicle system, which enables the detection of a decrease of the vehicle reference speed. For this an engine controller 120 is associated with the engine 110. The longitudinal acceleration of the vehicle, i.e. its acceleration in the longitudinal direction L, is measured by a longitudinal acceleration sensor 130. The wheel accelerations of the wheels 86, 92, 98, 104 are each measured with the aid of the wheel speed sensors 146 associated with the wheels.

Furthermore, an electronic control and regulation unit 140 is provided, in which the method illustrated in connection with FIG. 1 is implemented. The longitudinal acceleration sensor 130 is preferably integrated into the control and regulation unit 140.

While the above description constitutes the preferred embodiment of the present invention, it will be appreciated that the invention is susceptible to modification, variation, and change without departing from the proper scope and fair meaning of the accompanying claims.

The invention claimed is:

1. A method for the detection and correction of a decrease in vehicle reference speed by drag torque or regeneration torque, of an all-wheel drive motor vehicle in which all wheels are driven, wherein all of the wheels are connected to each other via a powertrain such that no wheels are free-rolling, with an engine and an engine controller, the longitudinal acceleration of the motor vehicle being measured with an acceleration sensor and the wheel accelerations of all of the wheels being determined with wheel speed sensors, comprising the following steps:
   filtering the wheel accelerations of all of the wheels to provide filtered wheel accelerations of the wheels,
   filtering the longitudinal acceleration to provide a filtered longitudinal acceleration,
   forming a corrected longitudinal acceleration by applying a safety offset and a correction offset to the filtered longitudinal acceleration, and
   integrating over time a difference between the corrected longitudinal acceleration and the filtered wheel accelerations to define an integrated difference, and
   correcting the vehicle reference speed when the absolute value of the integrated difference between the corrected longitudinal acceleration and the filtered wheel accelerations exceeds a threshold value during a predetermined time interval for a predetermined number of the wheels wherein a pulse is triggered at one or more of the wheels of the motor vehicle for correction of the vehicle reference speed;

wherein the correction offset is calculated as the difference between the longitudinal acceleration and an average wheel acceleration that is averaged across four of the wheels.

2. The method as claimed in claim 1, wherein the correction offset is continuously calculated during the operation of the vehicle.

3. The method as claimed in claim 1, wherein the results of the calculating the correction offset is not considered if the magnitude of a total of the drag torque exceeds a predetermined threshold value.

4. The method as claimed in claim 1, wherein the results of the calculating the correction offset is not considered if the vehicle reference speed is below a predetermined threshold value.

5. The method as claimed in claim 1, wherein the results of the calculating the correction offset is not considered if during the predetermined time interval the difference between a maximum and a minimum wheel acceleration for at least one of the wheels changes by more than the predetermined threshold value.

6. The method as claimed in claim 1, wherein the results of the calculating the correction offset is not considered if during the predetermined time interval a load change or a downshift is carried out.

7. The method as claimed in claim 1 wherein the correction offset is characterized as invalid if the last calculation of the correction offset is older than a second predetermined time interval.

8. The method as claimed in claim 1, wherein the longitudinal acceleration is subjected to a second filtering prior to the formation of the corrected longitudinal acceleration.

9. The method as claimed in claim 8, wherein the wheel accelerations are subjected to a second filtering following the filtering of the wheel accelerations.

10. The method as claimed in claim 8, wherein the second filtering of the longitudinal acceleration and the filterings of the wheel accelerations are low pass filterings and are adapted to each other so that the filtered signals have no phase delay in the stable state of the vehicle.

11. The method as claimed in claim 1, wherein the integrating is started when a decrease in wheel speed at the wheels results from the existing regeneration torque or drag torque being less than a predetermined value.

12. The method as claimed in claim 11, wherein the integrating is started when the regeneration or the drag torque is below a second predetermined threshold value.

13. The method as claimed in claim 1, wherein the integrating is terminated following the expiry of a predetermined maximum integration time.

14. The method as claimed in claim 1, wherein the pulse is a diagonally distributed supporting pulse.

15. The method as claimed in claim 14, wherein the supporting pulse has a hydraulic pressure between 5 and 10 bar.

16. The method as claimed in claim 1, wherein a request for engine braking control is sent to the engine controller for correction of the vehicle reference speed.

17. The method as claimed in claim 9, wherein the correction offset is calculated as the difference between the twice filtered longitudinal acceleration and the wheel acceleration that is twice filtered and averaged across four of the wheels.

* * * * *